United States Patent [19]

Byerly et al.

[11] Patent Number: 4,692,877
[45] Date of Patent: Sep. 8, 1987

[54] DIGITAL TIMING CONTROL SYSTEM WITH MEMORY LOOK AHEAD

[75] Inventors: Kent A. Byerly, Tucson, Ariz.; Marvin E. Feldhacker, Longmont; Duane E. Grant, Boulder, both of Colo.

[73] Assignee: IBM Corporation, Armonk, N.Y.

[21] Appl. No.: 879,247

[22] Filed: Jun. 27, 1986

[51] Int. Cl.⁴ .............................................. H04N 1/27
[52] U.S. Cl. .................................. 364/514; 358/285; 350/6.6
[58] Field of Search ........................ 364/518–520; 350/6.5, 6.1, 6.6–6.8; 358/206, 208, 285; 346/160, 107, 108

[56] References Cited

U.S. PATENT DOCUMENTS

| | | | |
|---|---|---|---|
| 4,032,888 | 6/1977 | Broyles et al. | 358/285 |
| 4,178,064 | 12/1979 | Mrdjen | 350/6.6 |
| 4,482,902 | 11/1984 | Bailey et al. | 346/108 |
| 4,541,061 | 9/1985 | Schoon | 364/519 |

*Primary Examiner*—Arthur G. Evans
*Attorney, Agent, or Firm*—Pollock, Vande Sande & Priddy

[57] ABSTRACT

A pel timing clock compensates for the non-linear displacement profile of a resonant galvanometerscanner. A pel time counter is loaded with a count value and outputs a clock pulse after expiration of a delay serial determined by the count value. Each time the clock pulse is produced the pel time counter is reloaded. The various count values are accessed from a memory which is addressed by an address counter whose contents are also altered each time the clock pulse is produced. The memory stores a sequence of count values which, when used to load the pel time counter, produces the desired sequence of clock pulses to compensate for the non-linear displacement profile of the scanner.

10 Claims, 6 Drawing Figures

DIGITAL TIMING CONTROL SYSTEM WITH MEMORY LOOK AHEAD

DESCRIPTION

1. Field of the Invention

The present invention relates to production of a timing clock for image pel distribution to compensate for the non-linear displacement profile of a resonant galvanometer scanner. The pel timing clock is equally usable for laying down an image by modulating a scanning laser beam and/or reading an image as the reflection of a scanning laser beam.

2. Background Art

Reading and/or writing imaging systems rely on scanning the document to be read/written with an optical beam. Heretofore the most popular scanning devices used a multi-faceted rotating mirror or prism. Because of the disadvantages (especially the required precision and corresponding cost) of these multi-faceted mirrors or prisms, other solutions have been sought. A popular alternative to the multi-faceted rotating mirror/prism is a mirror which is driven by a resonant galvanometer scanner. Resonant galvanometer scanners, and the manner in which they are employed for both reading and writing with an optical beam, are described in U.S. Pat. Nos. 4,178,064 and 4,032,888. More particularly, as shown in U.S. Pat. No. 4,178,064 data stored in element 13 is gated (by element 16) to an optical modulator 14 for purposes of modulating a light beam 12 produced by a laser 10; the modulated laser beam is caused to scan across a photoconductive drum 20 by a resonant galvanometer driven mirror 24. Reading using a resonant galvanometer scanner is shown in U.S. Pat. No. 4,032,888 wherein a laser beam produced by a laser 120 is caused to scan across an image field 178T by a resonant galvanometer driven mirror 162. The returned or reflected beam is detected by photodiodes 148 and written with the aid of a variable clock to a data bank 110. Unfortunately, the resonant galvanometer scanner, when used in its resonant mode, has an extremely nonlinear translation profile. In order to maintain the linearity of the image that is being written/read, a compensating non-linear clock is required.

In accordance with the prior art, one such nonlinear clock has been generated using a spatial grating, see Mrdjen U.S. Pat. No. 4,178,064. As an alternative, Broyles et al (U.S. Pat. No. 4,032,888) generate a non-linear clock by using a controllable divider, to divide down a much higher frequency clock.

Neither prior art solution is without its problems. The spatial grating of Mrdjen merely substitutes the cost of a grating for that of the multi-faceted mirror. The Broyles solution does not have the required range of compensation since he suggests using four different clock frequencies, and generally four clock frequencies are inadequate to cover the range of variation of motion of the scanning mirror in its resonant mode.

SUMMARY OF THE INVENTION

It is therefore an object of the invention to provide a non-linear pel timing clock so as to compensate for the non-linearities in the motion of the resonant galvanometer scanning mirror. It is another object of the invention to provide such a non-uniform pel timing clock generator which is capable of widely varying the delay between adjacent pels. It is another object of the invention to provide an optical data reader/writer using a resonant galvanometer driven scanning mirror and a compensating pel timing clock.

In accordance with one embodiment of the invention, the pel timing clock generator includes a pel time counter which is loaded with a count value in response to a load command. The pel time counter provides an output at a time following the load command determined by the count value; the pel time counter, once loaded, is counted by a high frequency clock and when it reaches a predetermined count (either an overflow or a zero count) it produces an output. The output of the pel time counter is employed for two purposes; it forms the data demand clock to clock a data serializer to provide pel data to the laser control; the data demand clock is also fed back and is used to generate the next load command. If the pel time counter was continually reloaded with the same value it would produce a constant clock. A constant clock would not compensate for the resonant galvanometer non-linearities.

In order to provide the different count values for the pel time counter, as required, the data demand clock is also used to change state of a pel address counter. Each different state of the pel address counter addresses a different memory location of a memory (in one embodiment a read only memory), from which is derived the count value for the pel time counter.

In accordance with the invention a look ahead feature is employed as follows. More particularly, an initiating pulse clears or resets the pel address counter. In this condition the counter addresses an initial memory location (location zero) and the memory provides a corresponding output. Thereafter, at start of scan a signal is employed to both increment the previously cleared pel address counter and to produce an initial load command for the pel time counter. At this time the count value output of the read only memory is located into the pel time counter. When the delay corresponding to the count value expires, the pel time counter produces a data demand clock, the initial pel clock pulse. At the time the initial pel clock pulse is produced, however, the pel address counter had previously been incremented to unity (by the start of scan) and correspondingly the read only memory had available the contents of the read only memory corresponding to the contents of the pel address counter (at location one). Therefore, when the initial data demand clock pulse is produced, and the corresponding (second) load command is generated, the count value is available from the read only memory; the initial data demand clock also increments the pel address counter so as to produce the next count value from the read only memory. Accordingly, while the pel time counter is counting out one count value, the pel address counter is one count ahead, so that by the time the pel time counter produces its output, the succeeding count value is available from the read only memory to reload the pel time counter.

Accordingly, the invention provides a pel clock generator especially suited for a resonant galvanometer scanner with a non-linear displacement profile comprising:

memory means for storing a parameter for a plurality of pels in a scan, said parameter corresponding to a time delay between the pel produced by the parameter and the preceding pel, preset counter means loaded from said memory means and responsive to a regular clock signal for generating a pel clock each time said preset counter means counts to a specified condition, address counter means with an output for addressing said memory means, and means for changing state of said address counter means in response to an output of said preset counter means.

In accordance with another aspect of the invention, an optical scanner is provided which comprises:

a source of a modulated optical beam, a resonant galvanometer scanner sweeping said optical beam with a non-linear displacement profile as a function of time, memory means for storing a parameter for a plurality of pels in a scan, said parameter corresponding to a time delay between a pel produced by said parameter and a preceding pel, preset counter means loaded from said memory means and responsive to a regular clock signal for generating a pel clock pulse each time said preset counter means counts to a specified condition, address counter means with an output for addressing said memory means, means for changing state of said address counter means in response to an output of said preset counter means, a data buffer, and means responsive to each occurrence of said pel clock for clocking said data buffer, whereby the non-linear displacement profile of said scanning action is compensated for by non-uniform spacing of said pel clock pulse.

BRIEF DESCRIPTION OF THE DRAWINGS

The present invention will be further described in the following portions of the specification when taken in conjunction with the attached drawings in which like reference characters identify identical apparatus and in which.

DETAILED DESCRIPTION

Figure 2:
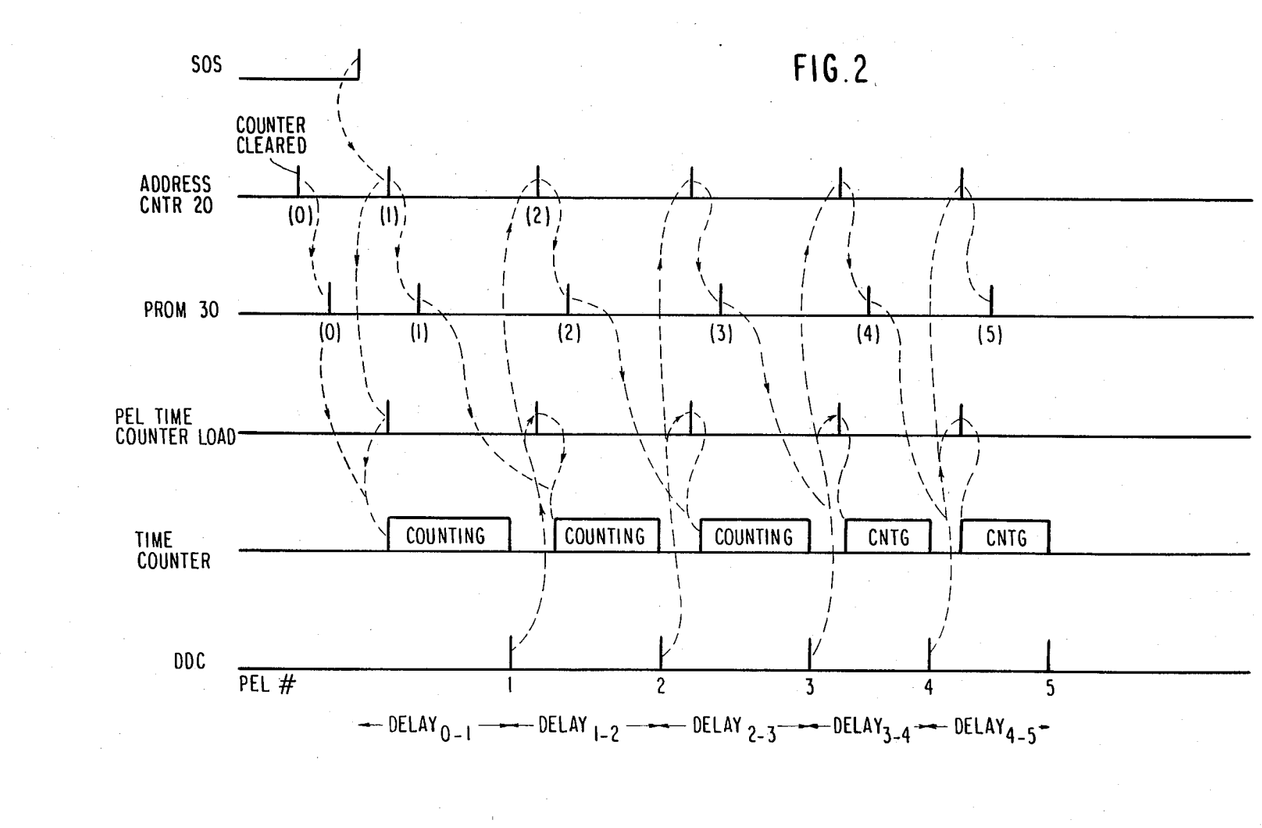
FIG. 2 is a timing diagram illustrating how the various signals produced by the elements of FIG. 1 occur in time relation to each other.
Figure 3:
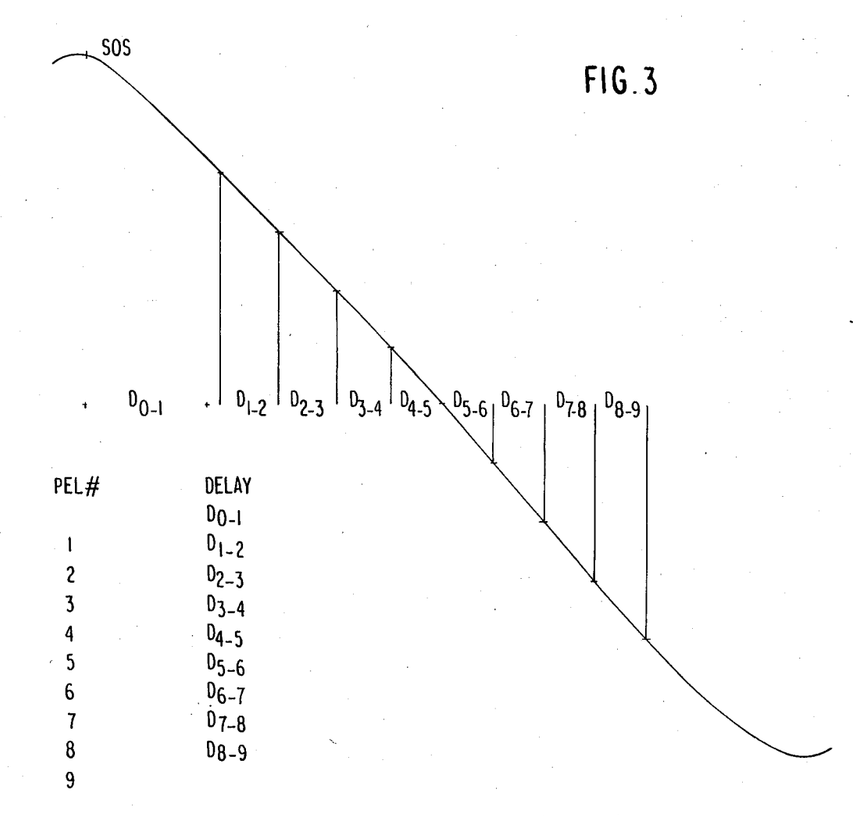
FIG. 3 illustrates position of the scan beam as a function of time, showing the non-linear translation profile.

FIG. 3 shows, as a function of time, a curve A representing the displacement of an optical beam driven by a resonant galvanometer; the extreme non-linearity has, in the past limited the extent of the sweep which was useful. As described hereinafter, with the present invention, almost any selected portion of the sweep is useful because the non-linear displacement of the beam as a function of time is compensated for by a corresponding non-uniform pel clock. In the embodiment described in connection with FIGS. 1, 2 and 4–6, the non-linear pel clock generator is used to clock a serializer driving a data writing device, however, it will be apparent that the pel clock generator can equally well be used with a data reader (where the pel clock is used to clock an input buffer with data from an optical transducer).

In order to develop the non-uniform clock, a pel address counter 20 (FIG. 1) is employed; as described hereinafter this can be simply a counter which is initialized prior to the start of scan, and counts up (or changes state) beginning at the start of scan until the end of scan where it is again initialized. The output of the pel address counter 20 is employed to address a memory such as Prom 30. The contents of the Prom 30 define, in a series of discrete memory locations, the delay (in a consistent time measure) between one pel and a succeeding pel. When addressed, the Prom 30 outputs a value corresponding to the time measure stored in the addressed location.

Figure 1:
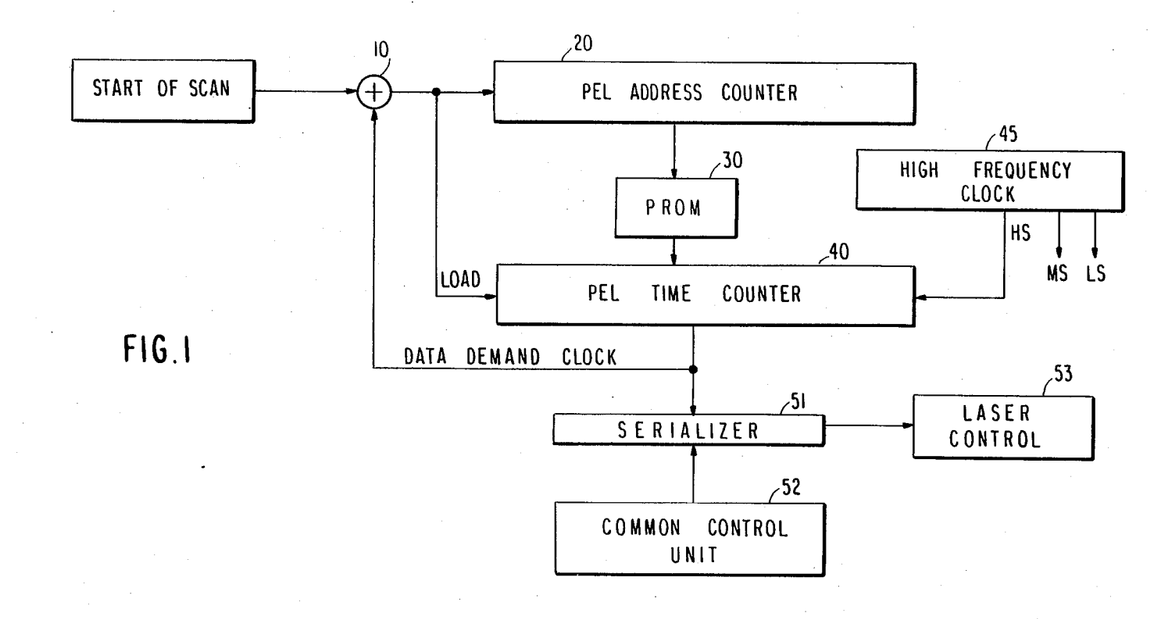
FIG. 1 is a block diagram of an embodiment of the invention and the manner in which the signals produced by the pel clock generator are employed to gate write data to a laser control.

When a load command is received, a pel time counter 40 is preset to a value corresponding to the output of the Prom 30. The pel time counter 40 is counted by a high frequency clock 45, in an embodiment of the invention actually constructed, at 100 MHz. The same clock divides down the high speed clock (HS) to produce two slower clocks, M (medium) S and L (low) S. When the pel time counter 40 overflows (or underflows), it produces an output called the data demand clock. The data demand clock is input to a serializer 51 where it is used as a clocking pulse. Data corresponding to the image to be written is derived from the common control unit 52 which includes a memory storing that data. For each clock pulse received by the serializer 50 (the data demand clock) a single bit of the image from the common control unit 52 is output to the laser control 53. Accordingly, a sequence of such bits will be paced by the data demand clock, and the non-uniformity of that pacing is arranged to compensate for the non-uniform translation of the scanning beam, in a manner to be described.

The data demand clock is also fed back to the gate 10 where it performs two functions, it causes a change of state of the pel address counter 20 and it constitutes a subsequent load command for the pel time counter 40. At the end of a scan, the pel address counter is cleared or reset, this addresses the memory 30 so that an initial count value is presented to pel time counter 40. At the beginning of scan an initial pulse performs both the functions of incrementing the pel address counter 20 and serving as a load command for the pel time counter 40. This initial pulse is derived from a start of scan pulse, and input to the gate 10.

The data stored in the Prom defines the desired time delay between adjacent pels. That data, however, can represent the time delay in a number of different fashions. In a most direct representation, the delay can represent the number of counts of the high speed clock (the clock which drives the pel time counter 40) corresponding to the delay. If the pel time counter is loaded with this particular count, and is decremented once per high speed clock pulse, then the time it takes the pel time counter 40 to reach the count of zero is the desired time delay. As an alternative, the data stored in the Prom 30 could, instead of being directly related to the desired time delay, represent the complement of the time delay. In this implementation, the pel time counter, once loaded with the data from the Prom, counts up and the end of the delay period is signalled by the counter overflowing. That is, if our desired time delay corresponds to six clock periods, we can either load the counter with the quantity six, arrange it to count down and signal the end of the desired time delay when the counter reaches zero, or load the counter with four, and increment the counter once per clock period to signal the end of the time delay when the counter overflows.

Those skilled in the art will understand that the desired delay is inversely related to the average instantaneous scanning velocity of the beam, averaged over the time it takes the beam to travel the distance between adjacent pels. Accordingly, if we used the second alternative (loading the counter with the complement of the desired time delay) that complement will be directly related to the average instantaneous scanning velocity.

FIG. 2 shows a timing diagram illustrating the interaction of the components shown in FIG. 1. FIG. 2 shows timing for the start of scan (SOS), the incrementing (and the resulting contents) of the address counter 20; the availability of data from the Prom 30, the production of the load command for the time counter 40, the overflow of the time counter 40 (time counter out) which corresponds to the data demand clock (DDC). All of these events are illustrated in FIG. 2 on a common time axis.

In FIG. 2 the "Address Counter" line shows transitions in the contents of the address counter as a vertical stroke, the resulting contents of the counter are shown below the stroke. The line "Prom" shows a short vertical stroke each time the address input to Prom 30 is altered, the new address is shown below. The "Time Counter Load" identifies each production of a load command to the pel time counter 40 as a short vertical stroke. The value to which the pel time counter 40 is preset is derived from the contents of Prom 30 at the address which is initially applied to the Prom 30 by that vertical stroke which is connected to the time counter load by a dashed line. The line "time counter" shows the counting duration of the counter and the falling transition is the output. This is repeated (for convenience) on the next line "Data Demand Clock".

Referring now to FIG. 2, prior to SOS the counter 20 had been cleared, address an initial Prom location. The initial pulse results in incrementing the pel address counter 20, so that thereafter it stores a unity value. After a slight delay, the Prom 30 outputs the contents of its address location 1. In addition to incrementing the address counter 20, the initial pulse (via the gate 10) forms a load command for the pel time counter 40. At the time of this first load command, the Prom 30 has available the contents of its initial location. At the load command the pel time counter 40 is initialized; it begins counting and when it overflows (time counter out) the pulse corresponding to DDC (pel #1) is output. The production of the DDC as shown by the dotted line has two effects. In the first place, via gate 10, it forms another load command for the pel time counter 40. At the time of this (the second) load command of the pel time counter 40, the output of the first memory location of Prom 30 is available and therefore the pel time counter 40 is loaded with this value. The first DDC also (via gate 10) increments the pel address counter 20, so that thereafter it has the value 2. The value of 2 in the pel address counter 20 addresses the Prom 30 so that shortly thereafter the contents of the second memory location of Prom 30 is available at its output. When pel time counter 40 had been loaded (with the contents of memory location one) the high frequency clock 45 began clocking the pel time counter so that it began counting. The value which was initially loaded in the pel time counter 40 determines the length of the delay$_{1-2}$. At the termination of that delay the time counter overflows (time counter out) and this produces DDC for pel #2. This DDC is fed back to increment the pel address counter 20 so it thereafter has the count 3. The same DDC forms a load command for the pel time counter 40 so that it can load the output of the Prom's second memory location. Thereafter the pel time counter 40 begins counting out delay$_{2-3}$.

In general subsequent to any load command for the time counter 40, the pel address counter is addressing the next memory location and the contents of that next memory location are available to the pel time counter (where that value awaits the next load command). The pel time counter is counting out the previous period; and when that counting is completed, the next DDC is produced.

FIG. 3 shows an example of how the non-uniform sweep displacement can be compensated. More particularly, FIG. 3 shows an example in which nine pels are produced through a sweep. The delays ($D_{0-1}$ to $D_{8-9}$) are measured and the value stored in the Prom 30 are selected to produced the desired delays. In actual practice the values stored in the Prom 30 may be less than the values needed to produce the measured delays by a constant, processing delay which is equal for all pels. More particularly, the delay between production of pel 1 and pel 2 is $D_{1-2}$. If our circuit has a constant processing delay $\delta$ (from output of pel time counter 40 until the bit is actually clocked out of CCU 52), we actually store the value $D_{1-2}-\delta$. As is apparent from FIG. 3, in order to produce the nine pels shown in FIG. 3 we need nine delays, nine values stored in the Prom 30. However, it should also be apparent that there is a point of symmetry in that each of the delays progressively decreases until the production of pel 5, thereafter each of the delays increases.

Accordingly, in a preferred embodiment of the invention the contents of the pel address counter 20 are monitored; when it reaches a predetermined count, it thereafter reverses its direction of counting. For example, the pel address counter may be incremented from a count of 0 to 5, and it is thereafter decremented back down to 1. Thus the Prom 30 need only store five delay values instead of nine.

Figure 4:
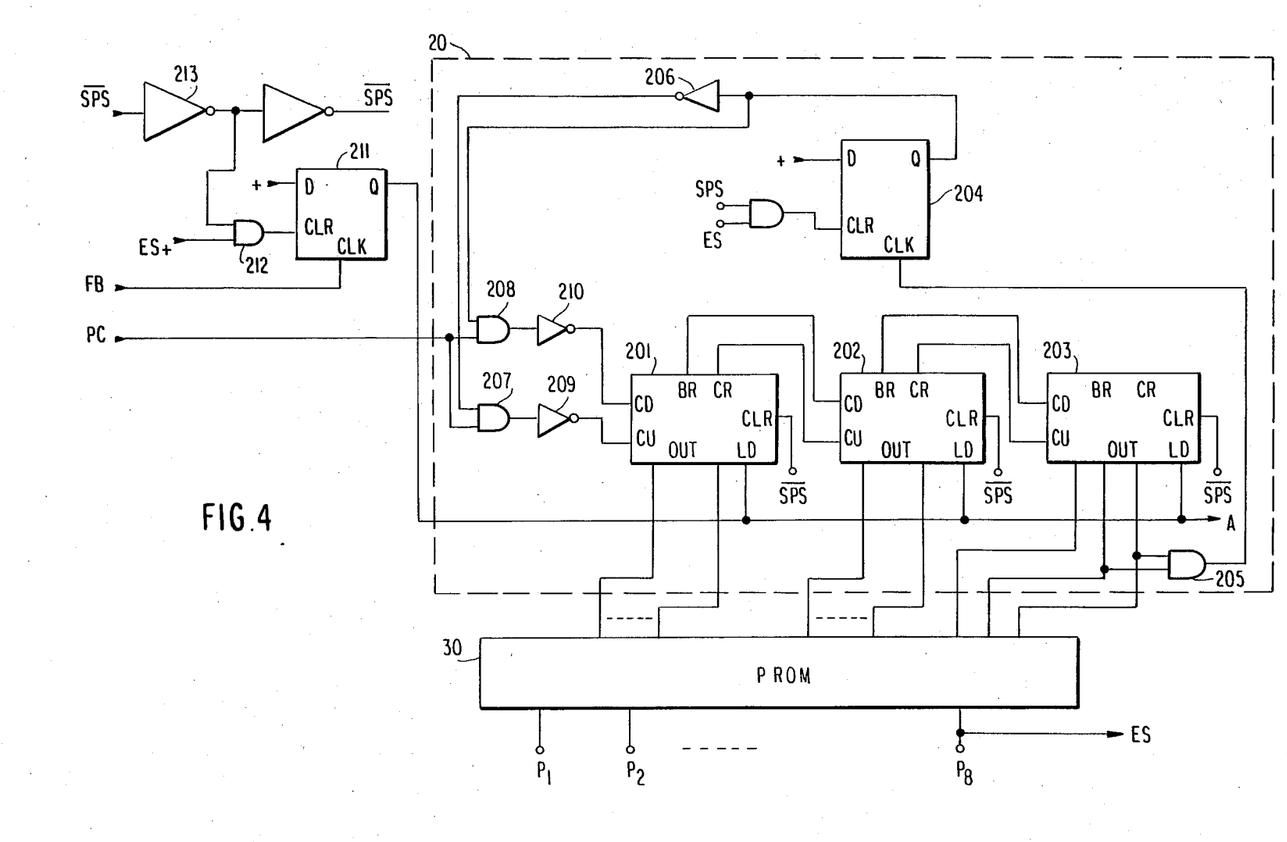
FIGS. 4–6 is a schematic of a preferred embodiment of the block diagram of FIG. 1.
Figure 5:
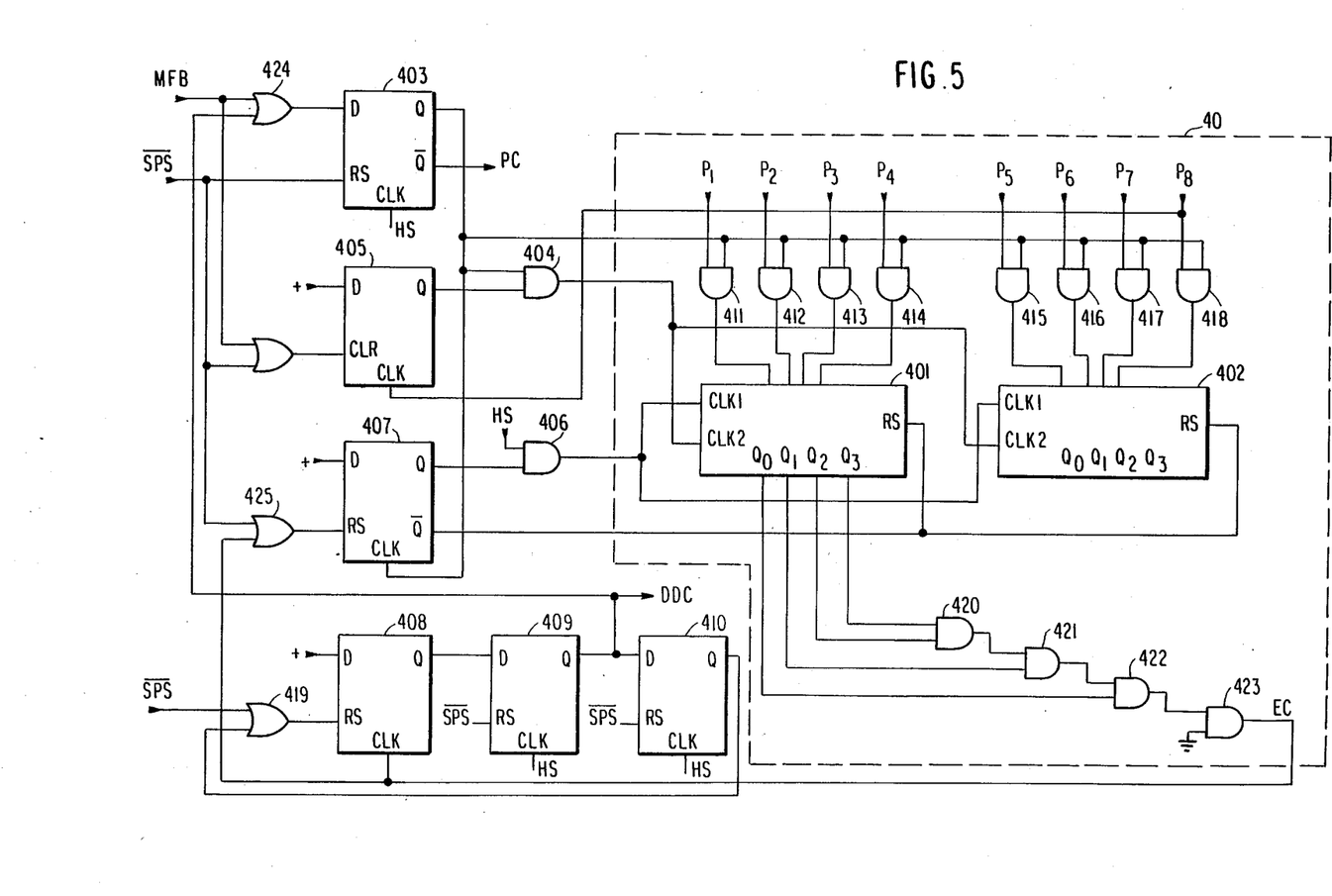
Figure 6:
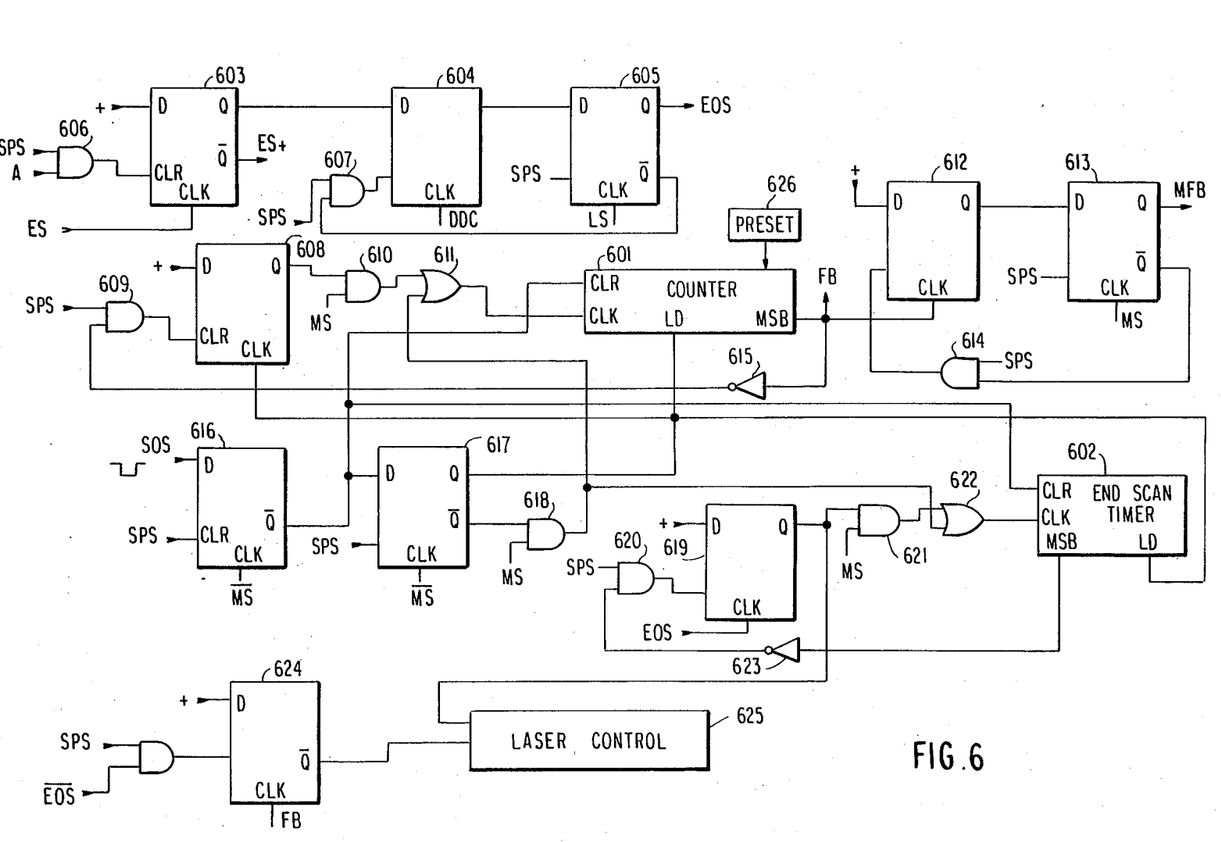

FIGS. 4-6 disclose a preferred embodiment of the invention which has actually been constructed. In the following description that embodiment will be described in specific terms although those skilled in the art will realize that the invention can be implemented in a a variety of forms which should not be limited by the specifics described in connection with FIGS. 4-6.

FIG. 4 illustrates the pel address counter 20, the Prom 30, their interconnection and associated circuitry; FIG. 5 shows the pel time counter 40 and its associated circuitry; FIG. 6 shows circuitry employed to generate some of the input signals for the circuitry shown in FIGS. 4 and 5.

The pel address counter includes counters 201-203. The state of flip-flop 204 determines whether or not the counter elements 201-203 count up or down; as will be described hereinafter, the state of the flip-flop is changed in the course of a single scan to change the direction of count. The output states of the counter elements 201-203 form addressing inputs to the Prom 30. In addition the most significant output bits are input to an AND gate 205, the output of which clocks the flip-flop 204 so that it changes state. The flip-flop is initialized in the course of the first scan after power up by use of the ES signal, which will be described hereinafter. The Q output of flip-flop 204 provides the input to an inverter 206. The output of the inverter 206, and its input, provide inputs to AND gates 207 and 208, respectively. The signal PC is the other input in common to the gates 207 and 208, whose outputs, coupled through respective inverters 209 and 210 form the CU (count up) and CD (count down) control inputs to the counter elements 201-203, respectively. The flip-flop 211 is used to synchronize the pel address counter 20 on power up, as will be described hereinafter. Its CLR input is provided by the output of AND gate 212, one of whose inputs is SPS (system preset), from the inverter 213, and the other of whose inputs is the signal ES+ (the derivation of which will be described below).

FIG. 5 shows the pel time counter 40, and the peripheral control circuits associated therewith. The main elements of the pel time counter 40 include counter elements 401 and 402. The counter elements 401 and 402 can be loaded (or preset) by the output of the gates 411-418, respectively, each of which has an input provided by the output of the Prom 30 (inputs $P_1-P_8$). A second input to each of the AND gates 411-418 which is provided in common is the Q output of flip-flop 403. Flip-flop 403 is set by the signal MFB or the signal DDC, the production of both of which will be described hereinafter. The signal MFB is relied on to load the pel time counter 40 for the first count, and thereafter the signal DDC is employed to reload the pel time counter 40 for each new time value to be counted. The flip-flop 403 is clocked by a high speed clock HS (in an embodiment actually constructed this clock had a 100 MHz rate). The $\overline{Q}$ output of flip-flop 403 is the signal PC. Because of the high rate of clocking of flip-flop 403 the signal PC is produced very shortly after a signal which loads the pel time counter 40 (an is employed to increment or decrement the pel address counter 20—see FIG. 4). The Q output of flip-flop 403 is also an input to AND gate 404, the other input to which is provided by the Q output of flip-flop 405. Flip-flop 405 is cleared by either the signal MFB or SPS, and clocked by the last output of the Prom 30 (ES) during the course of a scan. The output of AND gate 404 provides CLK2 to the counter elements 401, 402. CLK2 is merely an enable signal to enable the counter 40 during the active sweep of the beam and to disable it during the laser's back swing. The output of AND gate 406 provides the normal or counting clock (CLK1) for the counter elements 401 and 402. One input to AND gate 406 is the 100 MHz clock HS, the other input is the Q output of flip-flop 407. Flip-flop 407 is clocked by the Q output of flip-flop 403 and is reset either by $\overline{SPS}$ or by the signal EC (the production of which will be described below).

FIG. 5 also includes flip-flops 408, 409 and 410. Flip-flop 408 has its clocking input coupled to the count EC, and the Q output of the flip-flop provides the input to flip-flop 409. The Q output of flip-flop 409 provides the input to flip-flop 410; both flip-flops 409 and 410 are clocked by HS. The Q output of flip-flop 410 is fed back to an OR gate 419 to reset the flip-flop 408. The other input to the OR gate 419 is the signal $\overline{SPS}$.

In the embodiment being described, although we employ counter elements 401, 402, we only employ the most significant bits, that is $Q_0-Q_3$, of the outputs of the counter element 401. The latter two provide the input to AND gate 420, the output of which provides one input to gate 421, the other input to which is $Q_1$. The output of gate 421 is the input to gate 422, the other input to which is the output $Q_0$. The output of gate 422 is the only active input to the gate 423, the output of which is EC (the end count for any time interval or delay period). As will be apparent, when $Q_0-Q_3$ are simultaneously equal, gates 420-423 will be satisfied, producing EC (end of count).

Normally, to time any pel period, the output of the Prom 30 is gated (via the gates 411-418) to preset the counter elements 401, 402 on the production of a DDC (which will be described below). On production of the DDC a pulse is coupled through the OR gate 424 to set the flip-flop 403, enabling the gates 411-418. The Q output also clocks flip-flop 407 to partially enable AND gate 406, so that thereafter the output of the AND gate 406 follows the high speed clock HS. When the counter elements 401, 402 have been counted to the terminal count EC (they have counted out the delay period), AND gate 423 produces the signal EC to clock flip-flop 408 (and also to reset flip-flop 407 to terminate the counting of the counter elements 401, 402). Flip-flop 407 is reset via the OR gate 425. With flip-flop 408 set, shortly thereafter flip-flop 409 becomes set (since it is clocked by the high speed clock HS). When flip-flop 409 is set its Q output produces the DDC, one of whose functions is, via OR gate 424, to set flip-flop 403. Each time flip-flop 403 is set, it is very shortly thereafter reset, since it is also clocked by the signal HS.

Each time flip-flop 403 is set a new value from the Prom 30 is loaded into the counter elements 401, 402. At the same time flip-flop 409 becomes set (to produce DDC) flip-flop 410 becomes set, and its Q output is coupled via OR gate 419 to reset flip-flop 408. Since flip-flop 409 is clocked by the high speed clock HS, when flip-flop 408 is reset, shortly thereafter flip-flop 409 is reset so that the signal DDC terminates. The signal DDC will not be produced again until the next time the signal EC is produced by down counting the quantity which has been loaded into the counter elements 401, 402.

FIG. 6 shows associated peripheral circuitry which allows synchronization of the operation of the circuits of FIGS. 4 and 5 with the scanning motion of the resonant galvanometer scanner. As shown in FIG. 6, two additional counters 601 and 602 are employed. Counter 602 is used to time from the end of a first scan to the beginning of the next (that is to count through the laser back swing), and counter 601 is employed to time the initial portions of a scan. At the beginning of a scan, when the flip-flop 211 (FIG. 4) is set, it produces an output to load the pel address counter elements 201-203; the same signal (referred to as A) is input to the gate 606 (FIG. 6) to ensure that the flip-flop 603, once a scan has begun, is cleared. At the end of a scan when the Prom 30 outputs a bit on the conductor $P_8$ (referred to as ES) this is coupled to clock the flip-flop 603, to set it. Setting flip-flop 603 enables flip-flop 604 when the subsequent DDC is produced. Flip-flop 605 is set from flip-flop 604 (shortly subsequent thereto since it is clocked by the low speed clock LS). When flip-flop 605 is set it produces the signal EOS (end of scan); this signal is described below. Shortly after the flip-flops 604 and 605 are set, they are prepared for resetting by $\overline{Q}$ of 605; resetting occurs on the next DDC. At the beginning of the next scan (when flip-flop 603 is reset as referred to above) its $\overline{Q}$ output goes high (the signal referred to as ES+); this is coupled through the gate 212 (see FIG. 4) to clear the flip-flop 211.

The SOS (start of scan) signal goes low as the laser beam begins its forward scanning motion (this is detected by an optical detector). The low going input to flip-flop 616 resets the flip-flop; the high going $\overline{Q}$ output has two effects. It clears the start of scan counter 601 and it also provides for setting flip-flop 617 (which is clocked by the medium speed clock MS). When flip-flop 617 is set (shortly after flip-flop 616 is reset) the counter 601 is loaded via data defined by the presetting switches 626. When flip-flop 617 becomes set, flip-flop 608 is clocked so that it too becomes set, partially enabling AND gate 610 to pass the clock MS, via OR gate 611 to clock the start of scan counter 601. The start of scan counter 601 is arranged to time the period it takes for the laser beam to swing from the point at which it is detected (to produce SOS) to the beginning of the writing field. When that occurs, the output MSB becomes high; this is referred to as the FB signal (which clocks flip-flop 211 (see FIG. 4). The same signal also clocks the flip-flop 612 (see FIG. 6) which accordingly becomes set to enable flip-flop 613 to become set (when clocked by the medium speed clock MS). When flip-flop 613 is set it produces MFB (slightly delayed from FB); this is the input to OR gate 424 (see FIG. 5) which begins the process of counting out a pel time value. After production of MFB flop-flops 612 and 613 are reset (by $\bar{Q}$).

At the conclusion of SOS, flip-flop 616 becomes set; this results in flip-flop 617 becoming reset. When the signal FB is produced, it is inverted by inverter 615, coupled through the gate 609 to clear or reset flip-flop 608 which disables the gate 610.

When EOS is produced (flip-flop 605), it clocks flip-flop 619, which become set. This enables AND gate 621 to clock the end of scan timer 602, via the OR gate 622. Setting flip-flop 619 provides an input to the laser control 625 to turn off the laser beam (since the scan is over). When the end of scan timer 602 produces its MSB, that signal is used via the inverter 623 to reset flip-flop 619 to prepare it for a next cycle of operation.

At the beginning of the scan, when the start of scan counter 601 produces FB, this is used to clock flip-flop 624. When flip-flop 605 is reset, clocking the flip-flop 624 resets it and its $\bar{Q}$ output is input to the laser control 625 to turn the laser on.

It should therefore be apparent that the circuitry of FIG. 6 synchronizes the various timers and counters to the motion of the laser beam, the laser beam is turned off at end of scan, and the position of the laser beam is detected at the start of scan. This eventually produces the signal FB to re-initialize the pel address counter 20 to begin a scanning cycle again. At the beginning of a scanning cycle, the laser control 625 turns the laser beam back on, the pel address counter 20 is initialized (by the Q output of flip-flop 211), the Prom 30 is addressed and it produces a first output. When the slightly delayed signal MFB is produced, the flip-flop 403 is set which enables the pel time counter 40 to be loaded at the output of the Prom. When that value is down counted, the signal EC is produced which eventually produces the DDC to again set the flip-flop 403 and begin the next timing period. Each time flip-flop 403 is set, it is shortly thereafter reset so as to increment the pel address counter (via the signal PC). When the pel address counter has counted half way through the scan, the gate 205 (FIG. 4) is enabled to clock flip-flop 204 to change the direction of counting. The same operation continues but now the Prom address space is traversed in the opposite direction. When Prom 30 is addressed beyond the last pel time, ES is produced which, after a suitable delay, generates an EOS. EOS is used to start end scan timer 602 and turn off the laser.

In the specific embodiment described the DDC was used to clock data to modulate a writing laser beam. It should be apparent that the invention is not so limited. Exactly this same pacing operation is required when directing a scan laser beam onto a record to be modulated by the record's light/dark pattern. The data resulting from optically sensing the modulated, reflected beam requires a compensating clock to clock a data buffer and the invention provides such a clock.

Having thus described our invention, what we claim as new, and desire to secure by Letters Patent is:

1. A pel clock generator especially suited for a resonant galvanometer scanner with non-linear displacement profile comprising:
   memory means with a plurality of memory positions for storing a parameter for a plurality of pels in a scan;
   preset counter means loaded from said memory means and responsive to a regular clock signal for generating a pel clock each time said preset counter means counts to a specified condition,
   address counter means with an output for addressing said memory means, and
   means for changing state of said address counter means in response to an output of said preset counter means.

2. The device of claim 1 which further includes means enabling an output of said preset counter means to reload said preset counter means with a current output of said memory means and coupling said output of said preset counter means to said means for changing state to cause said address counter means count a pulse.

3. The device of claim 1 or claim 2 in which said address counter means further includes:
   a counter,
   control means for directing said counter to count up or down, and logic means responsive to said counter reaching a predetermined count for directing said control means to reverse a direction of counting of said counter.

4. The device of claim 1 which further includes means responsive to a start of scan pulse to enable said preset counter means, and after a delay, to change state of said address counter means whereby said preset counter means is counting to produce a pel clock pulse while said address counter means is addressing a position of said memory means beyond that used to preset said preset counter means.

5. The device of claim 1 which further includes means responsive to a pel clock pulse to reload said preset counter means with a then current output of said memory means, and after a delay, to change state of said address counter means whereby said preset counter means is counting a first value while said address counter means is addressing a position of said memory means containing a value for thereafter loading said preset counter means.

6. An optical scanner comprising:
   a source of a modulated optical beam;
   a resonant galvanometer scanner sweeping said optical beam with a non-linear translation profile as a function of time;
   memory means with a plurality of memory positions for storing a parameter for a plurality of pels in a scan;
   preset counter means loaded from said memory means and responsive to a regular clock signal for generating a pel clock each time said preset counter means counts to a specified condition;

address counter means with an output for addressing said memory means;

means for changing state of said address counter means in response to an output of said preset counter means;

a data buffer; and means responsive to each occurrence of said pel clock for clocking said data buffer;

whereby the non-linear profile of said scanning action is compensated for by non-uniform spacing of said pel clock pulse.

7. The device of claim 6 which further includes means enabling an output of said preset counter means to reload said preset counter means with a current output of said memory means and coupling said output of said preset counter means to said means for changing state to cause said address counter means count a pulse.

8. The device of claim 6 or claim 7 in which said address counter means further includes:

a counter, control means for directing said counter to count up or down, and logic means responsive to said counter reaching a predetermined count for directing said control means to reverse a direction of counting of said counter.

9. The device of claim 6 which further includes means responsive to a start of scan pulse to enable said preset counter means, and after a delay, to change state of said address counter means whereby said preset counter means counts a first value while said address counter means is addressing a first position of said memory means different from that which produced said first value.

10. The device of claim 6 which further includes means responsive to a pel clock pulse to reload said preset counter means with a then current output of said memory means, and after a delay, to change state of said address counter means whereby said preset counter means begins counting a first value while said address counter means is addressing a position of said memory means storing a value for a next counting operation.

* * * * *

UNITED STATES PATENT AND TRADEMARK OFFICE
CERTIFICATE OF CORRECTION

PATENT NO. : 4,692,877

DATED : September 8, 1987

INVENTOR(S) : Byerly et al

It is certified that error appears in the above-identified patent and that said Letters Patent is hereby corrected as shown below:

Abstract, line 2, "galvanometerscanner" should be -galvanometer scanner-.

Col. 2, line 37, "located" should be -loaded-.

Col. 6, line 18, "produced" should be -produce-;

line 45, the second "a" should be deleted.

Col. 7, line 32, "an" should be -and-.

Col. 9, line 22, "flop-flops" should be -flip-flops-.

Col. 10, line 33, -to- should be inserted after "means".

Col. 11, line 19, -to- should be inserted after "means".

Signed and Sealed this

Twenty-second Day of March, 1988

Attest:

DONALD J. QUIGG

Attesting Officer      Commissioner of Patents and Trademarks